Patented Sept. 29, 1925.

1,555,535

UNITED STATES PATENT OFFICE.

ANDRÉ WAHL, OF ENGHIEN, AND ROBERT LANTZ, OF PARIS, FRANCE, ASSIGNORS OF ONE-HALF TO SOCIETE ANONYME DES MATIERES COLORANTES ET PRODUITS CHIMIQUES DE SAINT-DENIS, OF PARIS, FRANCE.

PREPARATION OF PHENYL ROSINDULINE DYES.

No Drawing. Application filed October 22, 1923. Serial No. 670,100.

*To all whom it may concern:*

Be it known that we, ANDRÉ WAHL and ROBERT LANTZ, both citizens of France, and residents of Enghien, Seine-and-Oise, France, and Paris, France, respectively, have invented new and useful Improvements in the Preparation of Phenyl Rosinduline Dyes, which is fully set forth in the following specification.

In their French Patent No. 558,117 filed October 20, 1922, published August 22, 1923, which patent corresponds to United States application Serial No. 670,099, filed October 22, 1925, the present applicants have described a new class of naphthoquinone derivatives which are named 4-arylamino-1-arylimino-β-naphthoquinones.

These compounds constitute very valuable intermediate products for the manufacture of dyestuffs. When they are heated with primary amines under certain conditions they condense to form dyestuffs of the azine groups.

For instance, by heating in the neighbourhood of the boiling point 4-phenylamino-1-phenylimino-β-naphthoquinone dissolved in aniline in presence or absence of a suitable catalyst, such as benzoic acid, zinc chloride or acetic acid phenyl rosinduline is produced. The reaction is represented by the following equation:—

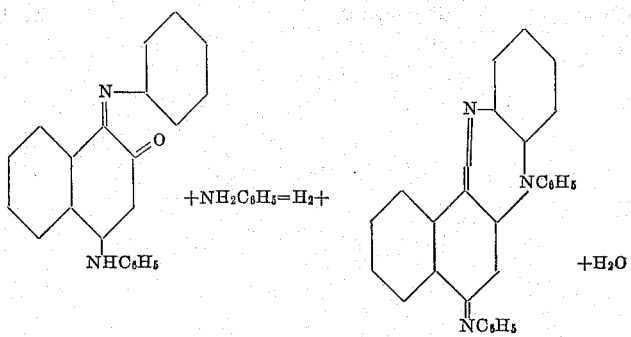

To avoid trouble due to the hydrogen liberated, it suffices to introduce into the mass a current of air or a suitable oxidizing agent.

In producing this change there may be used with like success the metallic compounds of 1-phenylimino-4-phenylamino-β-naphthoquinone, such compounds being obtained as prescribed in the aforesaid application Serial No. 670,099.

This reaction constitutes a synthesis of phenyl-rosinduline which has the advantage over known processes that it produces with a quasi-theoretical yield a product sufficiently pure to be transformed directly into azo-carmine by sulphonation.

The invention is illustrated by the following examples, which, however, may be considerably modified in detail.

*Example I.*—A mixture of 5 parts of 4-phenylamino-1-phenylimino-β-naphthoquinone, 25 parts of aniline and 1 part of benzoic acid is heated to about 160° C. while a current of air is caused to bubble through it. The transformation is followed by examining the colour of a test portion in sulphuric acid; at first it is brown, which becomes green by degrees. When the reaction is finished the phenyl-rosinduline may be isolated, for example by extracting the product with alcohol containing hydrochloric acid after the aniline has been eliminated, and precipitating by alkali the base of the phenyl-rosinduline.

In this example a metal compound of 4-phenylamino-1-phenylimino-β-naphthoquinone may be substituted for the compound itself and for the benzoic acid may be substituted another catalyst such as acetic acid or a metallic catalyst like zinc chloride.

Finally, a solution of 4-phenylamino-1-phenylimino-β-naphthoquinone in aniline, such as is obtained as described in the aforesaid application of Serial No. 670,099 may be used directly for the process of this example.

*Example II.*—A mixture of 80 parts of hydroxyphenyl-naphthylamine obtained as described in applicants' Patent 1,460,774, July 3, 1923, 960 parts of aniline and 20 parts of slaked lime is agitated in the cold in presence of air for about 10 hours. When the formaton of 4-phenylamino-1-phenylimino-β-naphthoquinone is complete the water produced is eliminated by heating the mixture on the water bath in a vacuum. There are then added 6 parts of fused zinc chloride and the whole is heated to near the boiling point while a current of air is caused to bubble through it. The progress of the reaction is followed as explained in Example I, and finally the aniline is expelled and the residue dried; it consists of very pure phenyl-rosinduline which may be directly sulphonated.

What we claim is:—

1. A method for the preparation of phenyl-rosinduline from 4-phenylamino-1-phenylimino-beta-naphthoquinone, which consists in heating the latter in aniline.

2. A method for the preparation of phenyl-rosinduline from 4-phenylamino-1-phenylimino-beta-naphthoquinone, which consists in heating the latter in aniline in the presence of an oxidizing agent.

3. A method for the preparation of phenyl-rosinduline from 4-phenylamino-1-phenylimino-beta-naphthoquinone, which consists in heating the latter in aniline in the presence of atmospheric oxygen.

4. A method for the preparation of phenyl-rosinduline from 4-phenylamino-1-phenylimino-beta-naphthoquinone, which consists in heating the latter in aniline in the presence of a suitable catalyst.

5. A method for the preparation of phenyl-rosinduline from 4-phenylamino-1-phenylimino-beta-naphthoquinone, which consists in heating the latter in aniline in the presence of an oxidizing agent and a suitable catalyst.

6. A method for the preparation of phenyl-rosinduline from 4-phenylamino-1-phenylimino-beta-naphthoquinone, which consists in heating the latter in aniline in the presence of benzoic acid and of an oxidizing agent.

7. A method for the preparation of phenyl-rosinduline from 4-phenylamino-1-phenylimino-beta-naphthoquinone, which consists in heating a metallic compound of the latter body in aniline.

In testimony whereof we have signed this specification.

ANDRÉ WAHL.
ROBERT LANTZ.